United States Patent Office 3,433,592
Patented Mar. 18, 1969

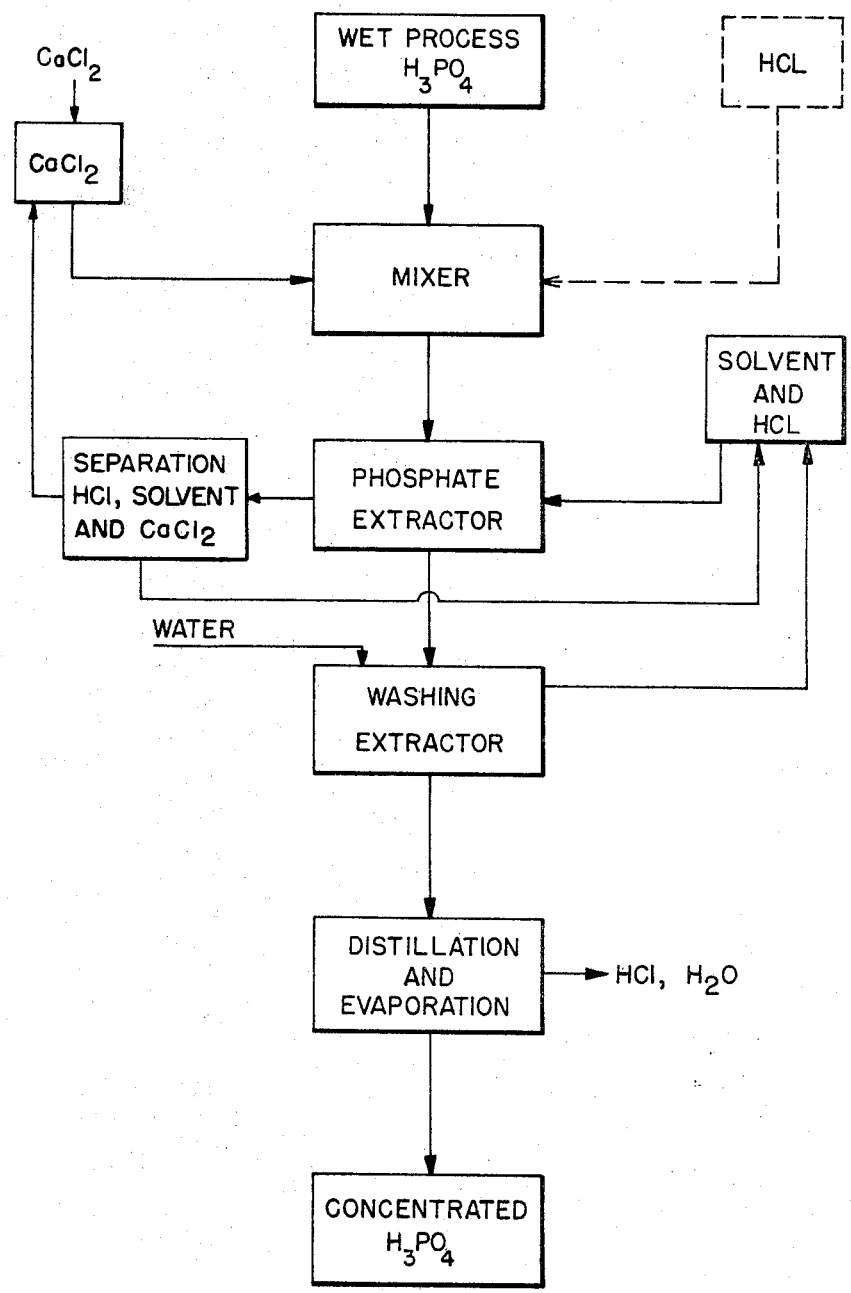

3,433,592
METHOD OF PURIFYING PHOSPHORIC ACID
Avraham Baniel, 20 Horeb St.; Ruth Blumberg, 25 Vitrkin St.; and Alexander Alon, 16a Tel-Maneh St., all of Haifa, Israel
Continuation-in-part of application Ser. No. 279,182, May 9, 1963. This application Apr. 7, 1966, Ser. No. 540,968
U.S. Cl. 23—165                                     5 Claims
Int. Cl. C01b 25/22; B01j 9/22

ABSTRACT OF THE DISCLOSURE

Wet process phosphoric acid produced by decomposing phosphate rock with either sulphuric or hydrochloric acid is extracted from the aqueous phase with an organic substantially water immiscible solvent. The degree of extraction and the purity of produced phosphoric acid is enhanced by controlling the calcium chloride content with respect to the $P_2O_5$ concentration in the aqueous medium prior to the extraction with the organic solvent.

---

The present invention relates to a process for purifying phosphoric acid, and more particularly, wet process phosphoric acid. This application is a continuation-in-part of application Ser. No. 279,182, filed on May 9, 1963, now abandoned.

The production of "wet process" phosphoric acid by the procedure which includes treating calcium phosphate-containing material with sulfuric acid is well known in the art and is described for example in Sauchelli, The Chemistry and Technology of Fertilizers, pp. 197–248, Reinhold Publishing Corp., New York, 1960. The production of "wet process" phosphoric acid by decomposing calcium phosphate-containing material with hydrochloric acid is also well known in the art and is described in U.S. Patent 2,880,063 (Baniel et al.) and U.S. Patent 3,072,461 (Long et al.). However, phosphoric acid produced by either the sulfuric acid or hydrochloric acid decomposition method contains a considerable amount of impurities such as silica, fluorine, calcium, arsenic, iron and other metals, and therefore, the resulting product has relatively limited uses. Most wet process phosphoric acid is used in the fertilizer industry where purity is not a primary consideration. While the prior art is replete with methods for purifying wet process phosphoric acid by both chemical and physical means, so that the acid may be used in foods and pharmaceuticals, the methods used are not entirely satisfactory. For example, the addition of inorganic chemical substances to wet process phosphoric acid removes only some of the many types of impurities present in the acid. Mechanical purification by filtration, decantation, centrifuging, distillation, absorption and the like does not produce phosphoric acid which is as pure as that produced by the well known thermal process. Because of its originally impure character and because of the costly, tedious and detailed operation that must be resorted to in order to purify it, wet process phosphoric acid per se or phosphoric acid purified by heretofore known methods has not been used for high grade chemical products, foods and pharmaceuticals.

It has, therefore, long remained a goal of the phosphoric acid industry to provide an efficient and economical method for purifying wet process phosphoric acid in order to obtain a product that can be used in foods and pharmaceuticals where purity is a critical requirement.

As a result of intensive investigations, we have now found an efficient and commercially economical method for purifying wet process phosphoric acid.

According to the present invention, in an aqueous phosphoric acid solution, which is free of solid impurities and is produced by decomposing tricalcium phosphate containing raw material with sulfuric or hydrochloric acid, a calcium chloride concentration is established according to the $P_2O_5$ concentration of the aqueous phosphoric acid solution. After establishing a certain calcium chloride concentration a hydrochloric acid concentration is established corresponding to the calcium chloride concentration present in the aqueous solution. Subsequent to the establishment of calcium chloride and hydrochloric acid concentrations the aqueous solution is subjected to countercurrent extraction with an organic substantially water immiscible solvent for extracting phosphoric acid. Alternatively, hydrochloric acid may be added directly to the organic solvent instead of the aqueous phosphoric acid solution. Upon liquid-liquid contact of the aqueous and solvent streams, phosphoric acid passes from the aqueous phase into the organic solvent phase. The calcium chloride, and impurities remain in the aqueous phase, and substantially all of the hydrochloric acid will be found also in the organic phase. The aqueous phase is separated from the solvent phase and the solutions are now termed, respectively, the aqueous raffinate and the solvent extract. Hydrochloric acid is separated from the aqueous raffinate and recirculated to a solvent storage tank and likewise the remaining calcium chloride solution may be recirculated to a storage tank for reuse in the process. Phosphoric acid is separated from the solvent extract and is concentrated by evaporation. The resulting acid is substantially free from impurities. The phosphoric acid obtained from the solvent extract does not need to be further purified to be useful for a variety of applications which could not be accomplished with wet process phosphoric acid purified only by extraction with a substantially water immiscible organic solvent without the controlled addition of calcium chloride and hydrochloric acid; also, the controlled addition of calcium chloride substantially enhances the degree of extraction of the phosphoric acid from the aqueous phase to the organic solvent phase.

For best results, the wet process acid that is to be purified must have a concentration of from about 140 to 450 grams $P_2O_5$ per liter. It has been discovered that selective extraction of purified phosphoric acid into the organic solvent phase is achieved most efficiently when specific amounts of calcium chloride and hydrochloric acid are present during the solvent extraction operation. Calcium chloride must be present in the wet process acid in a controlled amount to provide a concentration from about 175 to 330 grams per liter in the aqueous wet process acid solution. Furthermore, a total of 30 to 70 grams per liter of hydrochloric acid for each 100 grams of calcium chloride must be present either in the aqueous or in the organic solvent phase during the extraction operation.

The amount of calcium chloride in the aqueous wet process phosphoric acid must be carefully controlled. The amount of calcium chloride to be present in the aqueous wet process phosphoric acid depends on the $P_2O_5$ concentration of the aqueous phase. It was found that the effect of calcium chloride on the extractability of phosphoric acid from the aqueous phase is not always positive but depends on concentration of the phosphoric acid in the aqueous phase. Calcium chloride will not have a positive influence on the $P_2O_5$ extractability for all $P_2O_5$ concentrations but only within certain definite $P_2O_5$ ranges. The effect of calcium chloride in the aqueous wet process phosphoric acid is best described in the following table showing the change in distribution coefficient for different calcium chloride concentrates in the aqueous phase:

TABLE I.—THE INFLUENCE OF $CaCl_2$ ON EXTRACTABILITY

| Test No. | Feed mixture | | Distrib. coeff. $H_3PO_4$ organic/ aqueous phase |
|---|---|---|---|
| | $P_2O_5$, g./l. | Percent by weight $CaCl_2$ in aqueous sol. | |
| 1 | 135 | 18.5 | 0.50 |
| 2 | 135 | 4.2 | 0.15 |
| 3 | 135 | 0 | 0.07 |
| 4 | 165 | 16.0 | 0.32 |
| 5 | 165 | 6.0 | 0.14 |
| 6 | 176 | 19.0 | 0.50 |
| 7 | 176 | 12.0 | 0.42 |
| 8 | 176 | 6.0 | 0.20 |
| 9 | 200 | 19.3 | 0.40 |
| 10 | 200 | 16.6 | 0.32 |
| 11 | 235 | 3.1 | 0.33 |
| 12 | 250 | 16.6 | 0.32 |
| 13 | 250 | 3.1 | 0.33 |
| 14 | 250 | 0 | 0.13 |
| 15 | 475 | 4.6 | 0.23 |
| 16 | 475 | 0 | 0.21 |
| 17 | 740 | 9.7 | 0.37 |
| 18 | 740 | 0 | 0.41 |
| 19 | 1,060 | 2.2 | 0.48 |
| 20 | 1,060 | 0 | 0.68 |

From the above table, it can be seen that increasing concentrations of calcium chloride will increase the extractability of phosphoric acid from the aqueous phase into the organic phase within the range of approximately 130–200 grams per liter $P_2O_5$ content. However, as the $P_2O_5$ content of the aqueous solution increases to about 230–250 grams per liter, the relation between the extractability of phosphoric acid from the aqueous phase and the amount of calcium chloride present in the aqueous phase will not be directly proportional. Within that range increasing calcium chloride concentrations will not enhance the extractability of phosphoric acid but will rather depress it, and this is one of the main reasons why the calcium chloride concentration must be carefully controlled with regard to the $P_2O_5$ concentration in the aqueous phase. From the table, it can also be seen that after this critical range is passed up to approximately 475 grams per liter $P_2O_5$ content, increasing concentrations of calcium chloride will again enhance the extractability of phosphoric acid from the aqueous phase. However, $P_2O_5$ ranges between about 700 and 1100 grams per liter $P_2O_5$ again show the same inverse effect as observed in the lower ranges. Therefore, it is clear that in order to provide an economical and satisfactory process for extracting phosphoric acid from the aqueous phase by an organic substantially water immiscible solvent it is necessary to carefully control the amounts of calcium chloride present in the aqueous phase and also it is necessary to analytically determine the phosphoric acid concentration of the aqueous phase in order to establish the necessary amount of calcium chloride to be present for satisfactory results.

The calcium chloride used in this process may be obtained from any source, for example, the Solvay process. A portion of the calcium chloride requirement can be supplied by recirculating the calcium chloride separated from the aqueous raffinate to the wet-process acid, as indicated on the flow sheet and described more fully hereinafter.

Organic solvents that can be used in the process are those that are capable of dissolving phosphoric acid but having limited miscibility with water in the absence of phosphoric acid as well as in the presence of phosphoric acid and calcium chloride. The particular solvent used in the process may be ascertained by reference to data on mutual miscibility of solvents and water, which is well-known in the art and is available from the literature, e.g., Seidell, Solubilities of Organic Compounds, 3rd edition, vol. II, 1941, D. Van Nostrand Co., Inc., New York, N.Y.; and Landolt-Bornstein, Physikalisch-Chemische Tabellen, 1912, Julius Springer, Berlin, Germany. Representative solvents coming within the above definition are, for example, lower aliphatic alcohols and ketones of limited mutual miscibility with water, such as alcohols containing four to six carbon atoms in the aliphatic group used alone or in admixture, e.g., butanol, amyl alcohol, isoamyl alcohol and, also, trialkyl phosphates containing two to eight carbon atoms in the individual alkyl group, such as tributyl phosphates and mixtures thereof.

Reference is now made to the drawing showing, for the purpose of illustration, a flow sheet representative of the procedure for purifying wet-process phosphoric acid.

Wet-process phosphoric acid having a concentration of from 140 to 450 grams of $P_2O_5$ per liter is added to a mixing vessel. (The wet-process acid is prepared by the conventional method of reacting phosphate rock with sulfuric or hydrochloric acid and contains the impurities normally associated therewith.) A calcium chloride concentration of from 175 to 330 grams per liter is established in the wet process acid. Solid insoluble impurities may be removed from this mixture by filtration or countercurrent decantation. The mixture is then fed to a phosphoric acid extractor consisting of any suitable liquid-liquid extraction apparatus, for example, a series of mixer-settlers, and is contacted countercurrently with an organic solvent, e.g., amyl alcohol containing a predetermined amount of hydrochloric acid. For each 100 grams of calcium chloride in the system there must be present 30 to 70 grams per liter of hydrochloric acid. The hydrochloric acid may be added to the organic solvent, or the acid may be added to the impure wet-process acid along the calcium chloride, if calcium chloride addition is necessary, it being important that a certain quantity of hydrochloric acid is present during the extraction of the phosphoric acid from the aqueous solution into the organic solvent. It is believed that the presence of hydrochloric acid maintains the calcium chloride and phosphoric acid in ionic balance for enhancing the extractability of the phosphoric acid from the aqueous phase. The organic solvent, hydrochloric acid, calcium chloride, and aqueous phosphoric acid are intimately mixed in the phosphoric acid extractor. The phosphoric acid, substantially free from impurities, together with part of the hydrochloric acid, passes from the aqueous solution or phase into the solvent solution or phase. The calcium chloride and the balance of the hydrochloric acid remain in the aqueous phase. The aqueous phase is separated from the solvent phase and said solutions are now timed, respectively, the aqueous raffinate and the solvent extract. Hydrochloric acid is separated from the aqueous raffinate by a second solvent extraction operation, preferably using the same organic solvent as that employed to extract phosphoric acid. The solvent and the recovered hydrochloric acid are reused in the system. A minor amount of solvent remains in the aqueous calcium chloride solution, and the solvent can be recovered therefrom by steam stripping. The calcium chloride may be recirculated to a calcium chloride storage tank.

As pointed out above, the solvent extract contains phosphoric acid and a quantity of the hydrochloric acid. This extract is washed with water, and phosphoric acid and hydrochloric acid are transferred to the aqueous media, thus freeing the solvent for recycle. The aqueous acids, phosphoric and hydrochloric, are separated and concentrated by distillation and evaporation. The hydrochloric acid recovered may be recirculated to a solvent tank for reuse in the process. Phosphoric acid having a concentration of about 95% may be recovered. The acid is substantially free of impurities and compares favorably in quality with furnace-grade acid. The average phosphoric acid obtained by the process of the present invention contains approximately 0.003% $SO_4^{2-}$, 0.0001% As, 0.003% heavy metals expressed as Pb, 0.003% Fe. These analytical values show the effectiveness of the process.

It is apparent that the specific process described above in connection with the flow sheet is subject to numerous modifications, and in order to further illustrate the nature of the invention the following examples may be taken as illustrative and not by way of limitation thereof.

EXAMPLE 1

28.8 kg. of anhydrous calcium chloride was dissolved in 100 kg. of wet-process phosphoric acid produced by decomposing phosphate rock with sulfuric acid and containing 23% by weight of $H_3PO_4$. The solution containing 169 grams per liter $P_2O_5$ and 292 grams per liter calcium chloride was fed to a phosphate extractor comprising a series of mixer-settlers and contacted in countercurrent with 151 kg. of aqueous isoamyl alcohol containing 17.5 kg. of HCl. The solvent phase containing substantially pure $H_3PO_4$ and some HCl was separated from the aqueous phase and washed in countercurrent with water which took up the acids. The solvent was recycled. The aqueous phosphoric acid was freed from HCl and some of its water content removed by distillation. The produced phosphoric acid was of high purity and had an $H_3PO_4$ concentration of about 80% by weight.

EXAMPLE 2

30 kg. of anhydrous calcium chloride was dissolved in 100 kg. of wet-process phosphoric acid having an $H_3PO_4$ concentration of 24.2% by weight. The solution which contained 175 grams of $P_2O_5$ and 300 grams of calcium chloride per liter was fed to a phosphate extractor comprising a series of mixer-settlers and contacted in countercurrent with 254 kg. of aqueous butanol containing 15.8 kg. of HCl. Substantially pure $H_3PO_4$ and some HCl passed from the aqueous phase into the solvent phase which was further processed as described in Example 1.

EXAMPLE 3

254 kg. of a 27% by weight aqueous HCl solution was added in a digester to 100 kg. of calcined phosphate rock, containing 35% $P_2O_5$. The phosphate dissolved rapidly and after 30 minutes of stirring, the aqueous reaction mixture amounting to 269 liters contained 130 grams of $P_2O_5$ and 384 grams of calcium chloride per liter. In a separate digester, 93.5 kg. of 97% by weight $H_2SO_4$ was mixed with 100 kg. of calcined phosphate rock containing 35% of $P_2O_5$ suspended in recycle wash water and the mixture was stirred until the reaction was substantially complete. The aqueous reaction mixture had a $P_2O_5$ concentration of 30% by weight. The two aqueous reaction mixtures were combined and filtered. The filtrate containing 160 grams of $P_2O_5$ and 236 grams of calcium chloride per liter was extracted in countercurrent with 750 kg. of isoamylalcohol containing 64 kg. of water and 32 kg. of HCl. The solvent phase containing substantially pure phosphoric acid and some HCl was separated from the aqueous phase containing calcium chloride and HCl. From the aqueous phase the HCl was recovered by distillation. The residue was then subjected to distillation and evaporation. The phosphoric acid produced was of high purity and contained 95% by weight of $H_3PO_4$.

It will be understood that various changes, omissions and additions may be made to this invention without departing from the spirit and scope thereof as set forth in the appended claims.

What is claimed is:

1. In the process for producing phosphoric acid by treating tricalcium phosphate containing raw material with an acid selected from the group consisting of sulfuric acid and hydrochloric acid to produce an aqueous solution containing phosphoric acid and impurities from the raw material, extracting the phosphoric acid from the aqueous solution with an organic, substantially water immiscible solvent and recovering concentrated phosphoric acid solution from the organic solvent, the improvement which comprises maintaining the impurities in the aqueous solution by:

(a) Establishing a phosphoric acid concentration in the aqueous solution from about 140 to about 450 grams per liter calculated as $P_2O_5$;
   (b) Establishing a calcium chloride concentration from about 175 to about 330 grams per liter in the aqueous solution;
   (c) Establishing a hydrochloric acid concentration from about 30 to about 70 grams per liter per each 100 grams per liter calcium chloride present in the aqueous solution;

whereby the distribution coefficient of the phosphoric acid in the organic solvent and aqueous solution is enhanced and a concentrated phosphoric acid solution substantially free of impurities is produced.

2. The process of claim 1 wherein the tricalcium phosphate containing raw material is treated with sulfuric acid to produce an aqueous solution containing phosphoric acid and impurities from the raw material and the calcium chloride concentration is established in the aqueous solution from about 175 to about 330 grams per liter by adding calcium chloride to the aqueous solution.

3. The process of claim 1 wherein the tricalcium phosphate containing raw material is treated with hydrochloric acid to produce an aqueous solution containing phosphoric acid and impurities from the raw material, and the calcium chloride concentration is established in the aqueous solution from about 175 to about 330 grams per liter by adjusting the calcium chloride concentration in the aqueous solution.

4. The process of claim 1 wherein the organic solvent is selected from the group consisting of lower aliphatic alcohols and ketones of limited miscibility with water and trialkyl phosphates having from 2 to 8 carbon atoms in the individual alkyl groups.

5. The process of claim 1 wherein the hydrochloric acid is added to the organic solvent in an amount from about 30 to about 70 grams per liter per each 100 grams per liter calcium chloride present in the aqueous solution.

References Cited

UNITED STATES PATENTS

| 2,880,063 | 3/1959 | Baniel et al. | 23—165 |
| 3,072,461 | 1/1963 | Long et al. | 23—165 |
| 3,338,674 | 8/1967 | Baniel et al. | 23—165 |

OSCAR R. VERTIZ, *Primary Examiner.*

ARTHUR GREIF, *Assistant Examiner.*

U.S. Cl. X.R.

23—312